C. J. HUNTER.
MOTOR CYCLE BRACE.
APPLICATION FILED DEC. 13, 1913.
1,160,079.
Patented Nov. 9, 1915.
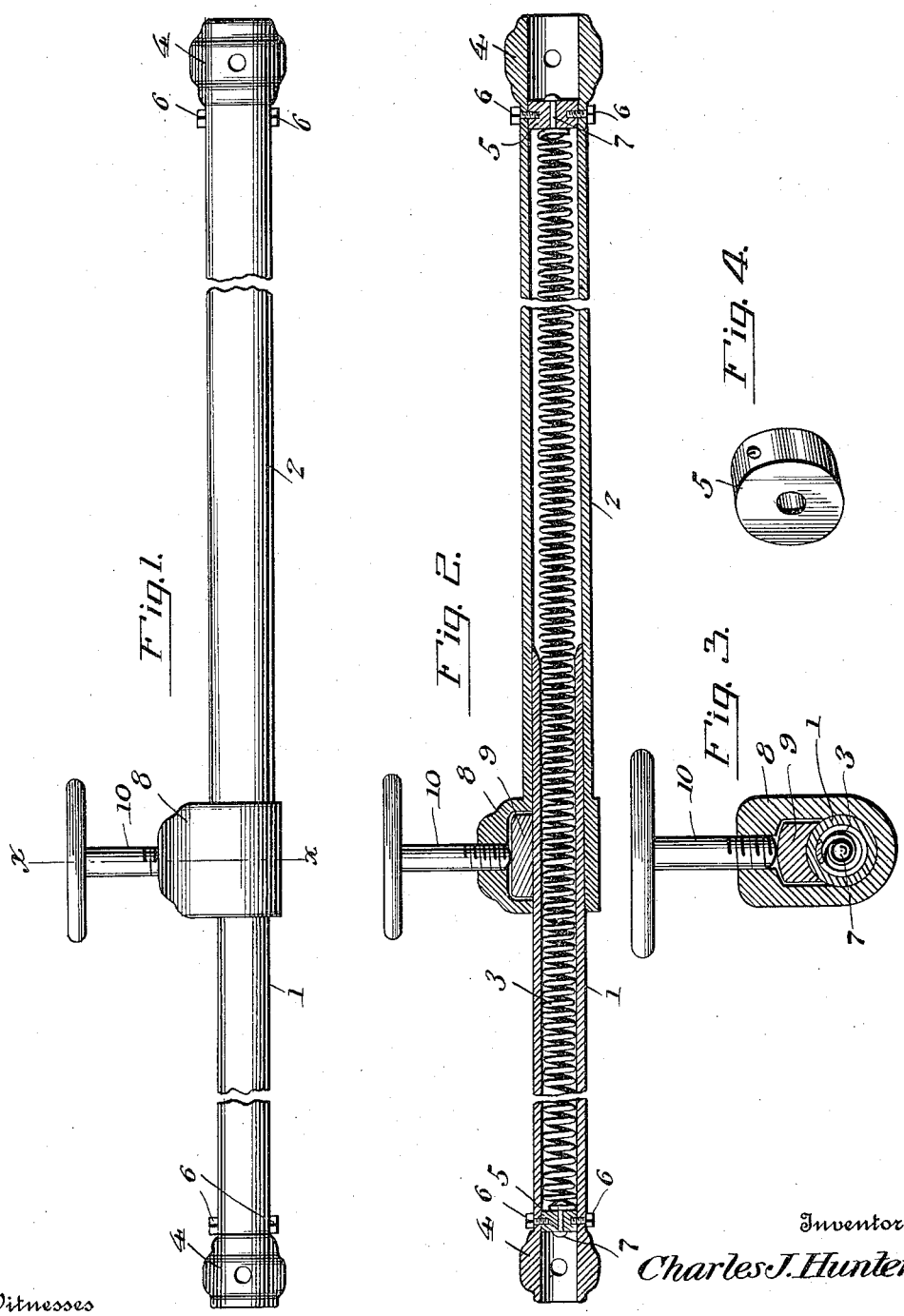
Witnesses
F. R. Moran.
V. B. Hillyard.
Inventor
Charles J. Hunter
By Victor J. Evans
Attorney

UNITED STATES PATENT OFFICE.

CHARLES JOHNSON HUNTER, OF NEWPORT NEWS, VIRGINIA.

MOTOR-CYCLE BRACE.

1,160,079. Specification of Letters Patent. Patented Nov. 9, 1915.

Application filed December 13, 1913. Serial No. 806,616.

*To all whom it may concern:*

Be it known that I, CHARLES J. HUNTER, a citizen of the United States, residing at Newport News, in the county of Warwick and State of Virginia, have invented new and useful Improvements in Motor-Cycle Braces, of which the following is a specification.

The invention provides a novel connection between a motorcycle and car or like attachment which will admit of a limited movement and yet, provide securing means for fixing the relative distance between the motorcycle and car when a rigid connection is desired.

The invention consists of a brace or connector embodying telescoping parts, a helical spring between such parts to offer a resistance both when extending or reducing the length of the connector or brace, and means between the telescoping parts for retarding the action of the spring or admitting of such parts being made secure against movement when a rigid connector is desired.

The invention consists of the novel features, details of construction and combination of parts, which hereinafter will be more particularly set forth, illustrated in the accompanying drawing, and pointed out in the appended claims.

Figure 1 is a view in elevation of a brace or connector embodying the invention. Fig. 2 is a central longitudinal section of the parts. Fig. 3 is a cross section on the line x—x of Fig. 1. Fig. 4 is a detailed view of the fastening ends provided at the ends of the helical spring.

Corresponding and like parts are referred to in the following description, and indicated in all the views of the drawing, by the same reference characters.

The brace or connector comprises two parts or members 1 and 2 which have a sliding or telescoping connection. These parts or sections are preferably tubular, so as to inclose a helical spring 3 which is fastened at its ends and the outer ends of the respective parts 1 and 2. The spring 3 is extensible and compressible and arranged within the brace in such a manner as to offer resistance to the inward or outward movement of the coupling members when actuated. When it is remembered that the spring 3 is capable of acting in both directions the necessity for securing its ends to the brace 1 and 2 will be readily apparent. The brace or connector in normal position is of a predetermined length, depending upon the distance between the motorcycle and the car or like part to be coupled thereto. The brace is adapted to be coupled to the motorcycle and car in any manner, and it is to be understood that one or more braces may be employed, and the same may extend in any direction depending upon the specific result to be attained.

A coupling end 4 is provided at each extremity of the brace, and may be of any nature, depending upon the particular form of joint required between the brace and the part to which such brace is coupled.

A plug 5 is attached to each end of the spring 3, and it is adapted to be secured within a section or part of the brace, preferably by means of a screw or fastening 6, which passes through an opening in a side of the brace member, and is fitted into an opening formed in the plug 5. A pin 7 or like fastening serves to connect the spring to the plug 5.

As hereinbefore stated, means are provided for modifying the action of the spring 3 or for securing the sections or parts of the brace in fixed relative position. These means consist of a housing 8 at the inner end of the section or part 2, a lug 9 fitted within the housing 8, and in contact with the section or part 1 and a screw 10 threaded into the housing 8 and adapted to engage the lug 9. The screw 10 may be adjusted to cause the lug 9 to bear against the section or part 1 with a greater or less pressure, thereby offering more or less resistance to the action of the spring 3. When the length of the brace is to be fixed the screw 10 may be turned to cause the lug 9 to engage the section or part 1 with such a pressure as to prevent any movement of the section 1 and 2 in either direction. In this latter capacity the means serve as a fastening or like device to hold the sections or parts 1 and 2 at the required adjusted position.

The present invention provides means for coupling a car or analogous adjustment to a motorcycle, such coupling means admitting of a relative movement between the motorcycle and adjustment, so that the parts may lean outward or inward according to the road conditions. The spring 3 provides a yieldable connection for returning the motorcycle and car to a normal position, whether the same have moved outward or inward. Should it be required to retard the action of the spring 3 the screw 10 may be adjusted to cause the lug 9 to engage the part 1 with a greater or less resistance, and when required, the length of the brace may be fixed by turning up the screw 10 to cause the lug 9 to bind against the part 1, so as to prevent any movement of the part 1 and 2.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention what is claimed as new, is:—

1. A motorcycle brace comprising telescoping members, a coiled spring disposed within said members and having its terminals secured to opposite ends thereof said spring being adapted when the members are actuated in an inward or outward direction to move said members in the opposite direction, and a housing upon the end of one of said members provided with a shoe and screw said shoe being normally adapted to yieldably engage with one of the coupling members and retard the movement of said coupling members under the action of the above mentioned spring.

2. A motorcycle brace comprising telescoping members, a coiled spring disposed within said members and having its terminals secured to opposite ends thereof said spring being adapted when the members are actuated in an inward or outward direction, to move said members in the opposite direction, and a housing upon the end of one of said members provided with a shoe and screw said shoe being adapted to frictionally engage with one of the coupling members and lock said coupling members against movement under the action of the above mentioned spring.

In testimony whereof I affix my signature in presence of two witnesses.

CHARLES JOHNSON HUNTER.

Witnesses:
 ROBT. H. KOONTZ,
 F. P. BARTLETT.